(12) United States Patent
Wutte

(10) Patent No.: US 7,027,985 B2
(45) Date of Patent: Apr. 11, 2006

(54) SPEECH RECOGNITION METHOD WITH A REPLACE COMMAND

(75) Inventor: Heribert Wutte, Graz (AT)

(73) Assignee: Koninklijke Philips Electronics, N.V., Eindhoven (NL)

( * ) Notice: Subject to any disclaimer, the term of this patent is extended or adjusted under 35 U.S.C. 154(b) by 892 days.

(21) Appl. No.: 09/945,872

(22) Filed: Sep. 4, 2001

(65) Prior Publication Data

US 2002/0046032 A1 Apr. 18, 2002

(30) Foreign Application Priority Data

Sep. 8, 2000 (EP) ............................................ 00890276

(51) Int. Cl.
  *G10L 15/26* (2006.01)
  *G10L 21/06* (2006.01)
  *G10L 21/00* (2006.01)
  *G06F 17/00* (2006.01)

(52) U.S. Cl. ...................... 704/235; 704/270; 704/276; 715/530; 715/540

(58) Field of Classification Search ................ 704/235, 704/251, 270, 276; 715/530, 540
See application file for complete search history.

(56) References Cited

U.S. PATENT DOCUMENTS

| | | | | |
|---|---|---|---|---|
| 4,914,704 A | * | 4/1990 | Cole et al. ................... | 704/235 |
| 5,231,670 A | * | 7/1993 | Goldhor et al. .............. | 704/275 |
| 5,794,189 A | | 8/1998 | Gould ......................... | 704/231 |
| 5,864,805 A | * | 1/1999 | Chen et al. .................. | 704/235 |
| 5,875,429 A | * | 2/1999 | Douglas ...................... | 704/275 |
| 5,875,448 A | * | 2/1999 | Boys et al. .................. | 715/531 |
| 5,884,258 A | * | 3/1999 | Rozak et al. ................. | 704/251 |
| 5,909,667 A | * | 6/1999 | Leontiades et al. ......... | 704/275 |
| 6,064,959 A | * | 5/2000 | Young et al. ................ | 704/251 |
| 6,327,566 B1 | * | 12/2001 | Vanbuskirk et al. ......... | 704/257 |
| 6,347,296 B1 | * | 2/2002 | Friedland ..................... | 704/231 |
| 6,418,410 B1 | * | 7/2002 | Nassiff et al. ............... | 704/251 |
| 6,601,027 B1 | * | 7/2003 | Wright et al. ................ | 704/235 |

* cited by examiner

*Primary Examiner*—David L. Ometz
*Assistant Examiner*—Brian Albertalli

(57) ABSTRACT

A speech recognition method (4) with a text editing method of editing a text information part (TW) erroneously recognized in first text information (TI1) with a four-word spoken command (SB) recognized in second text information (TI2) is disclosed. The speech recognition method comprises the steps of receiving speech information (SI) and recognizing the first text information (TI1) and the second text information (T2), checking whether a word at the first position in the second text information (TI2) matches a first spoken command part (SB1) and checking whether a word at the third or further position in the second text information (TI2) matches a third spoken command part (SB3) while, in the event of a positive result of the checks, the next step of the text editing method is executed, checking whether the first text information (TI1) contains the erroneously recognized text information part (TW) which is featured by a second spoken command part (SB2) in the second text information (TI2) between the first spoken command part (SB1) and the third spoken command (SB3) while, in the event of a positive result of the check, the next step of the text editing method is executed, replacing the erroneously recognized text information part (TW) in the first text information TI1 with new text information part (TN) which the second text information (TI2) contains as a fourth spoken command part (SB4) of the four-word spoken command (SB) after the third spoken command part (SB3).

13 Claims, 3 Drawing Sheets

SPEECH RECOGNITION METHOD WITH A REPLACE COMMAND

Figure 1:
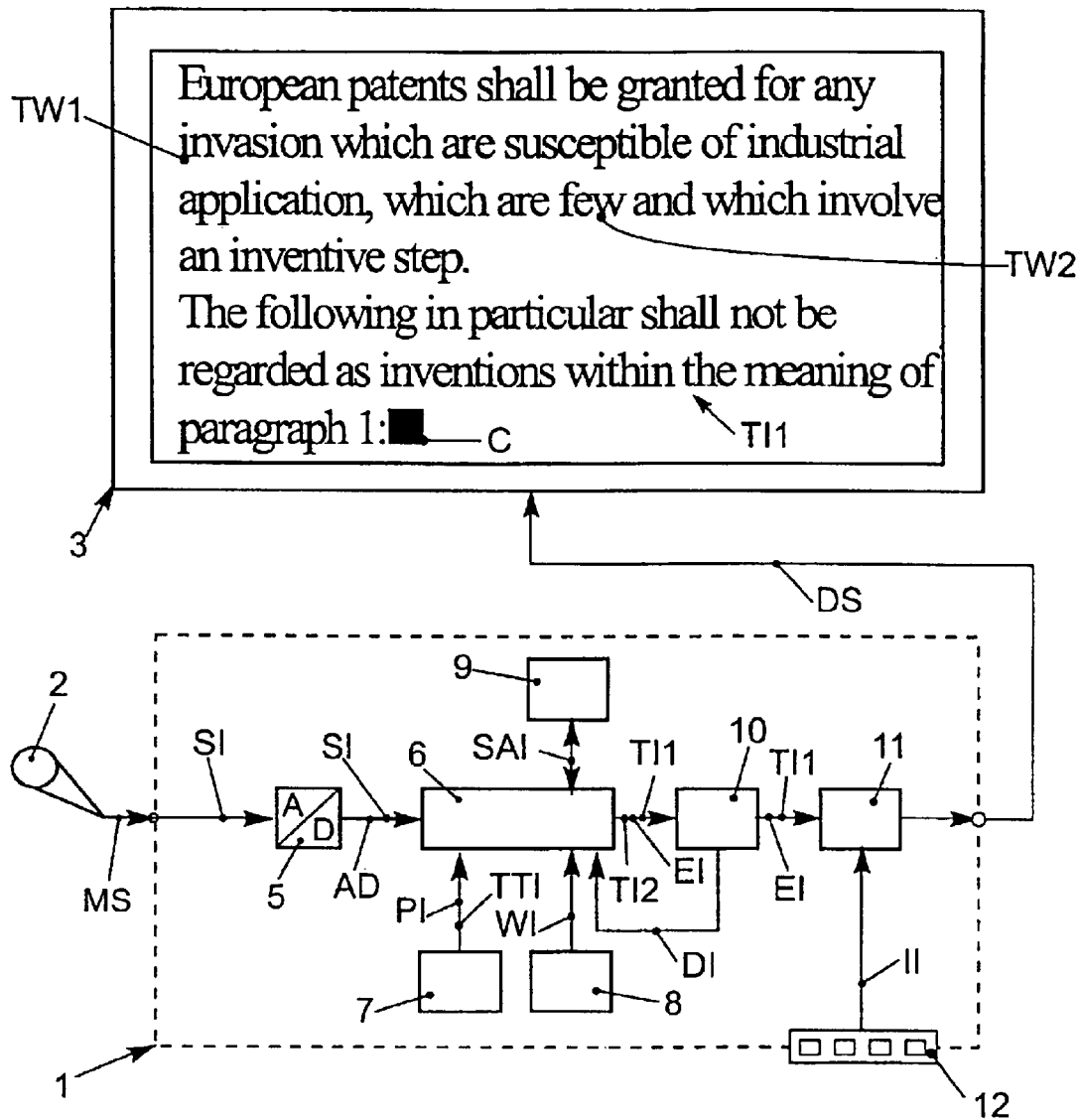

The invention relates to a speech recognition method with a text editing method for editing an erroneously recognized text information part by a spoken command.

The invention further relates to a computer program product which can be loaded directly into the internal memory of a digital computer and comprises software code sections.

Such a speech recognition method and such a computer program product are known from U.S. Pat. No. 5,794,189 and are processed by a computer to which a microphone and a monitor are connected. The known speech recognition method has a short-term text editing method by which a word can be edited by means of spoken commands, which word is erroneously recognized by the speech recognition method in the last recognized sentence of the recognized text.

When the user notices that the sentence recognized last by the speech recognition method contains an erroneously recognized word, he speaks a one-syllable spoken command "oops" into the microphone. Subsequently, an editing frame of the speech recognition method, which contains the erroneous sentence, is opened. Then the user can again utter the erroneously recognized word, after which the short-term text editing method tries to find the erroneously recognized word in the erroneous sentence by analyzing the speech analysis information determined during the recognition of the erroneous sentence, and replace it with the newly spoken and recognized word. When the user confirms the replacement by a further one-syllable spoken command, the erroneously recognized word in the erroneous sentence of the recognized text is replaced with the newly spoken word and the editing frame is closed.

With the known short-term editing method it has proved to be a disadvantage that the user has to utter two different one-word commands (oops; accept) as well as the word to be replaced into the microphone at various instants in the correct sequence and depending on the information displayed on the monitor, which is relatively complicated. Furthermore, with the known short-term editing method it has proved to be a disadvantage that the erroneously recognized word in the erroneous sentence is not found with sufficient reliability.

The known speech recognition method further includes a document text editing method of editing a word in the whole text of an active document. Words recognized erroneously or correctly as well as words entered via key strokes of the computer can be edited. When the user likes to change one of the words of the text, he utters "select" plus the word he wishes to change into the microphone of the computer, so that a two-word spoken command for marking a word is revealed. Then the known document text editing method generates a tree structure of the whole text of the document and searches in the tree structure for the text recognized from the spoken word.

When the computer selects and marks a word of the text and displays it with the monitor, the user can acknowledge or cancel the selection with a single spoken command. When the user acknowledges the selection and subsequently speaks a new word into the microphone, the marked word is replaced with the new word.

The known document editing method has proved to be disadvantageous in that the user has to utter two different spoken commands ("select"; "accept") as well as the word to be replaced plus the new word into the microphone at several points of time in the right sequence and depending on the information displayed by the monitor, which is relatively complicated. A further disadvantage of the known document editing method is that the word to be replaced cannot be found with sufficient reliability.

It is an object of the invention to eliminate the problems defined above and provide an improved speech recognition method in accordance with the first paragraph and an improved computer program product in accordance with the second paragraph. For accomplishing this object, features according to the invention are provided in such a speech recognition method, so that the speech recognition method may be featured in the manner described hereinafter.

A speech recognition method with a text editing method of editing an erroneously recognized text information part of first text information with a four-word spoken command recognized in second text information, the speech recognition method comprising the following steps:

receiving speech information and recognition of the first text information and the second text information;

checking whether a word at the first position in the second text information matches a first spoken command part of the four-word spoken command and checking whether a word at the third or further position in the second text information matches a third spoken command part of the four-word spoken command while, in the event of a positive result of the checks, the next step of the text editing method is executed;

checking whether the first text information contains the erroneously recognized text information part which is featured by a second spoken command part in the second text information between the first spoken command part and the third spoken command part while, in the event of a positive result of the check, the next step of the text editing method is executed;

replacing the erroneously recognized text information part of the first text information with a new text information part which the second text information contains as a fourth spoken command part of the four-word spoken command after the third spoken command part.

As a solution to this objective, such a computer program product has characteristic features according to the invention, so that the computer program product may be characterized by the features described hereinafter.

A computer program product, which can be directly loaded into the internal memory of a digital computer and comprises software code sections, with the computer executing the steps of the speech recognition method as claimed in claim 1 when the product runs on the computer.

As a result, a user can replace an erroneously recognized word with a new word by uttering a four-word spoken command only once. For example, a user could utter "replace test by text" to replace the erroneously recognized word "test" with the word "text". Additionally, before the replacement of the erroneously recognized text information, a re-calculation may be carried out in which the first text information that has the greatest probability of a correct recognition is determined, while the speech analysis information determined during the recognition of the first text information and the additional information contained in the spoken command is used. The information contained in the spoken command also contains information about the pronunciation of the mostly very similarly sounding erroneously recognized word "test" and the actual word to be recognized "text". With this additional information the speech recognition method therefore has the disposal of very accurate speech information for the re-calculation of the first text information, as a result of which editing information determined during this re-calculation extremely reliability matches the replacement desired by the user.

It is highly advantageous when the spoken command does not apply to the whole document, but only to the text part of the first text information, which part is just being displayed on the monitor. When the spoken command has induced an erroneous replacement, this can very easily be canceled by, for example, the spoken command "undo".

With the speech recognition method as claimed in claim 1 it has proved to be advantageous to provide the measures as claimed in claim 2. The advantage is then obtained that during a dictation the user can proceed with his dictation immediately after a correction of an erroneously recognized word, without the need to give a spoken command for positioning the cursor.

With the speech recognition method as claimed in claim 1 it has proved to be advantageous to provide the measures as claimed in claim 3. This offers the advantage that a spoken command for replacing an erroneously recognized word is obtained, which command can be very easily uttered and which nevertheless contains all the information necessary for the replacement.

In accordance with the measures claimed in claim 4, a plurality of alternative text information parts are determined for each spoken command part for the recognition of the second text information. Subsequently, for the second text information the alternative text information part for each spoken command part is chosen to obtain the highest overall probability of a correct recognition of the second text information for the whole recognized second text information. When the spoken four-word command is recognized, it may happen that not the text information part contained in the second text information, but one of the other alternative text information parts features the erroneously recognized word displayed on the monitor.

According to the measures of claim 4, the advantage is obtained that when the alternative text information part of the second spoken command contained in the second text information cannot be found in the first text information, the alternative text information parts of the second spoken command not contained in the second text information are also searched for as an erroneously recognized text information part in the first text information. This even further improves the reliability of finding the erroneously recognized text information part in the first text information.

According to the measures of claim 5, the advantage is obtained that if the new text information part spoken as the fourth spoken command word in the spoken command is recognized erroneously—just like the erroneously recognized text information part in the first text information—the alternative text information part having the highest-but-one overall probability of a correct recognition of the second text information and recognized after the fourth spoken command word, is defined as a new text information part. In consequence, the reliability is even further improved when the erroneously recognized text information part is replaced with the new text information part.

These and other aspects of the invention are apparent from and will be elucidated with reference to the embodiments described hereinafter.

Figure 2:
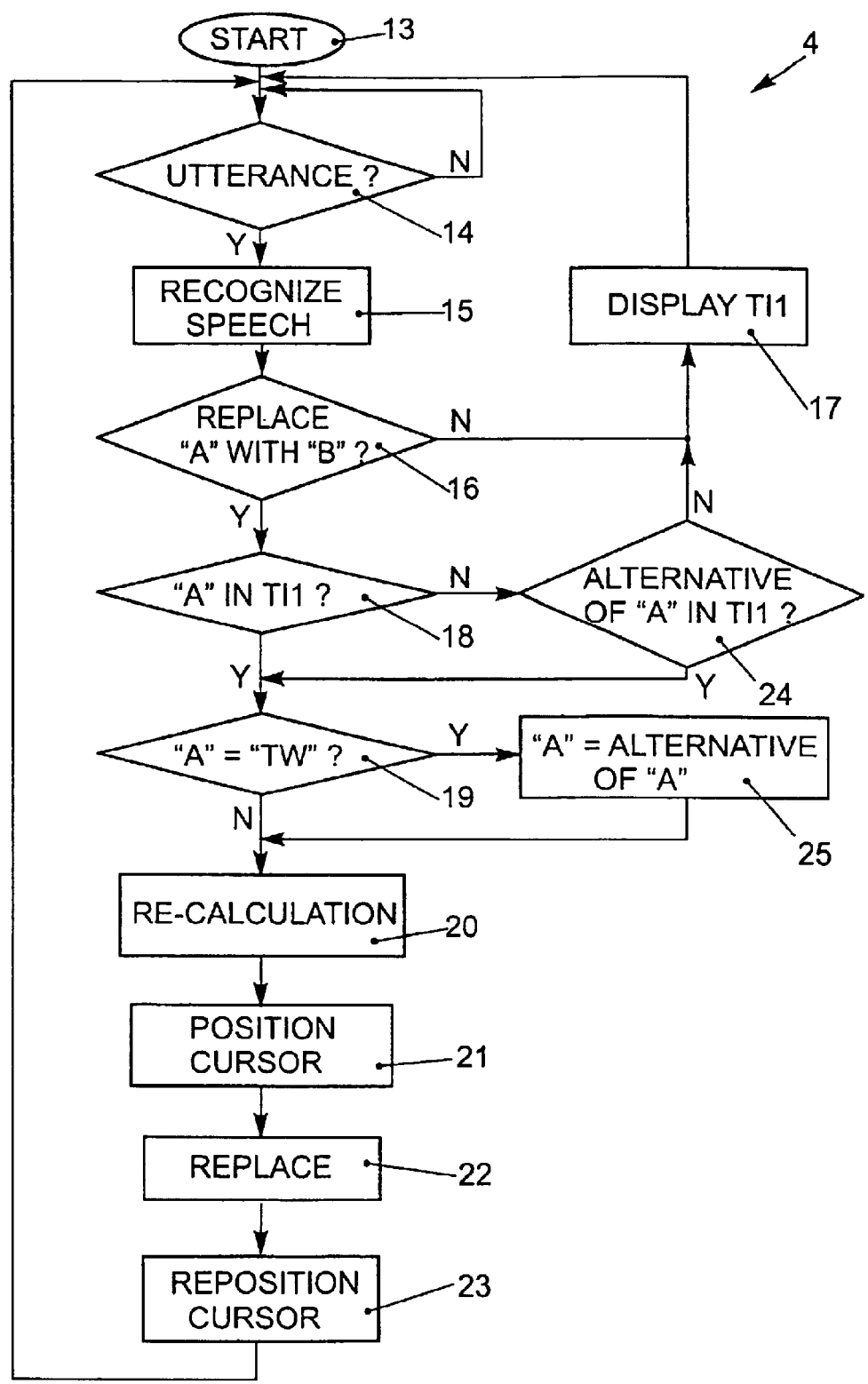
Figures 3, 4:
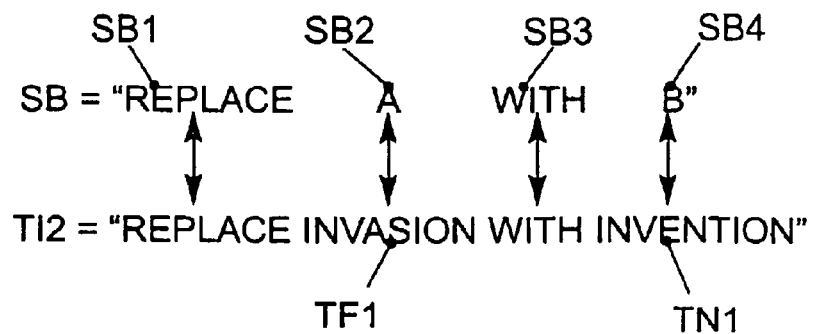

In the drawings:

FIG. 1 diagrammatically shows in the form of a block diagram a computer which executes a speech recognition method with a text editing method, FIG. 2 shows a flow chart of a speech recognition method with a text editing method, which is executed by the computer shown in FIG. 1, FIG. 3 shows the structure of a four-word speech command and second text information recognized as a four-word speech command by the computer, FIG. 4 shows spoken information parts and text information parts of the second text information recognized by the computer as alternatives to the spoken information parts.

FIG. 1 shows a computer 1 to which a microphone 2 and a monitor 3 are connected. Speech recognition software stored on a CD-ROM is loaded into a main memory of the computer 1, which software forms the computer program product. The computer 1 further includes a processor, a hard disk and further means for processing the speech recognition software, which means are customary at present and are not further shown in FIG. 1.

When the speech recognition software is loaded into the main memory of the computer 1, the computer 1 executes a speech recognition method with a text editing method for editing an erroneously recognized text information part TW with a four-word spoken command SB. The speech recognition method with the text editing method has the steps of a flow chart 4, which is shown in FIG. 2.

An analog microphone signal MS, which contains speech information SI, can be applied to the computer 1 by the microphone 2 when a user of the computer 1 speaks into the microphone 2. The computer 1 includes an analog-to-digital converter 5, to which the analog microphone signal MS can be applied. The analog-to-digital converter 5 is arranged for digitizing the analog microphone signal MS and for producing digital audio data AD, which contain the speech information SI contained in the microphone signal MS.

The computer 1 includes recognizer means 6, a context memory 7 and a speech model memory 8. In the context memory 7 are stored phoneme information PI and text information parts TTI. Phoneme information PI contains a sequence of phonemes which are used for featuring sounds. A text information part TTI contains the text of one or also a plurality of words which are to be recognized by the speech recognition method when the user utters as speech information SI the phoneme information PI stored in the context memory 7. When executing the speech recognition method, the computer 1 can recognize only words that are stored in the context memory 7 and produce them as text information TI.

In the speech model memory 8 is stored probability information WI about the sequence of words customary in a language. For example, the word sequence "this is a test" has a higher overall probability than the word sequence "this his a test".

The audio data AD can be applied to the recognizer means 6 by the analog-to-digital converter 5. The speech information SI contained in the audio data AD is subdivided into spoken information parts STI to which phoneme information PI is assigned, which subdivision takes place during the execution of the speech recognition method by the recognizer means 6. The phoneme information PI of the spoken information parts STI are searched for in the context memory 7, after which the text information part TTI is determined which is assigned to such phoneme information PI and is stored in the context memory 7.

If the phoneme information PI searched for is not found in the context memory 7, a plurality of phoneme information elements PI stored in the context memory 7 and similar to phoneme information PI searched for are determined and so are the text information parts TTI assignedly stored to these phoneme information elements PI. The text information parts TTI determined for the phoneme information PI of a spoken information part STI are entered into an alternatives table as alternative text information parts ATI for the spoken command parts STI. Such an alternatives table AT is shown in FIG. 4.

After the alternative text information parts ATI have been determined, the recognizer means 6 evaluate the probability information WI stored in the speech model memory 8 and determine the sequence of the alternative text information parts ATI as recognized text information TI that has the greatest overall probability of a correct recognition.

The recognizer means 6 use the so-called long-known Hidden Markov model for recognizing the text information TI to be assigned to the received speech information SI. The recognition of the text information TI to be assigned to the received speech information SI is not further entered into in this document.

The computer furthermore includes speech analysis storage means 9, which are arranged for storing speech analysis information SAI, which is determined by the recognizer means 6 when the speech recognition method is executed. The speech analysis information SAI contains, in addition to other information, the spoken information parts STI and associated phoneme information PI, as well as the alternative text information parts ATI entered in the alternatives table AT. Such speech analysis information SAI is known to the expert as so-called "lattice".

The computer 1 further includes replace means 10 to which the text information TI recognized by the recognizer means 6 can be applied, which information forms either first text information TI1 or second text information TI2. The replace means 10 are arranged for checking whether the recognized text information TI has the structure of a four-word spoken command SB="REPLACE A WITH B", as this is shown in FIG. 3. The four-word spoken command SB is provided for replacing an erroneously recognized word, which will be further discussed with reference to an example of application of the example of embodiment shown in FIG. 1.

The first word of the spoken command SB forms a first spoken command part SB="REPLACE" and the third or a further word of the spoken command SB forms a third spoken command part SB3="WITH", in which the first spoken command part SB1 and the third spoken command part SB3 feature the spoken command SB as such. The second word and, if necessary, also the third and fourth words in the spoken command SB form a second spoken command part SB2 for which the letter "A" is used instead. The second spoken command part SB2 features erroneously recognized text information part TW in the first text information TI1 displayed on the monitor 1. The word(s) following the third spoken command part SB3="WITH" form(s) a fourth spoken command part SB4 for which the letter "B" is given instead. The fourth spoken command part SB4 features a new text information part TN by which the erroneously recognized text information part TW in the first text information TI1 is to be replaced. This too will be discussed in more detail with reference to the example of application.

The replace means 10 are provided for producing the text information TI recognized by the recognizer means 6 unmodified as the first text information TI1 when the structure of the four-word spoken command SB is not found in the text information TI the replace means 10. When the replace means 10, on the other hand, find the structure of the four-word spoken command SB in the text information TI, the replace means 10 are provided for checking whether the recognized first text information TI1 contains the erroneously recognized text information part TF which is featured by the second spoken command part SB2. If the result of this check is that the erroneously recognized text information part TF of a spoken command is contained in the first text information TI1 as an erroneously recognized text information part TW, the replace means 10 apply detection information DI to the recognizer means 6, which detection information DI features the position of the erroneously recognized text information part TW in the first text information TI1.

When the detection information DI is received, the recognizer means 6 perform a re-calculation in which the speech analysis information SAI, which has led to the recognition of the words closest to the erroneously recognized word TW in the first text information TI1 and in which the speech analysis information SAI, which has led to the recognition of the word TF of the second spoken command part SB2 and of the word TN of the fourth spoken command part SB4, are processed in common. In this way, the acoustic information of the word TN uttered twice by the user, but erroneously recognized in the first text information, and also the acoustic information of the correct pronunciation of the word TW erroneously recognized in the first text information, is available. As a result of this re-calculation by the recognizer means 6, the recognizer means 6 apply editing information EI to the replace means 10, which information features the replacement to be carried out in the first text information TI1. This will be further discussed hereinafter with reference to the example of application.

The computer 1 further includes editing means 11, which are arranged for processing the first text information TI1 and the editing information EI applied to the editing means 11. The editing means 11 process the first text information TI1 and apply this information to the monitor 3 as an analog monitor signal DS to be displayed. The editing means 11 are arranged for replacing, on reception of the editing information EI, the erroneously recognized text information part TW in the first text information TI1 with the new text information part TN, which is featured by the fourth spoken command part SB4. This is further discussed hereinafter with reference to the example of application.

A keyboard 12 of the computer 1 can deliver input information II to the editing means 11 via which information the user of the computer 1 can enter text and make entries for editing the first text information TI1 displayed on the monitor 3. The editing means 11 have the functionality of an editing program processed by the computer 1, which program may be formed, for example, by the software program "Word for Windows®".

In the following are explained, with reference to an example of application of the computer 1 shown in FIG. 1, the advantages of the speech recognition method with the text editing method. According to the example of application it is assumed that the user of the computer 1 loads the speech recognition program into the main memory of the computer 1, after which the execution of the speech recognition method starts at a block 13 of the flow chart 4 in FIG. 2.

At a block 14 the recognizer means 6 check whether the user of the computer 1 has spoken into the microphone 2 and whether speech information SI has been delivered to the recognizer means 6. According to the example of application, the user is assumed to begin the text "European patents shall be . . . " of the article 52 (1) of the European patent agreement into the microphone 2, after which corresponding speech information SI is applied to the recognizer means 6 via the analog-to-digital converter 5.

Subsequently, the recognizer means 6 recognize during the execution of block 14 that speech information SI was received and execute the speech recognition method as described above in block 15. Then also the speech analysis information SAI determined while the text information TI is being recognized is stored in the speech analysis storage means 9. As a result of the execution of the speech recognition method, the recognizer means 6 deliver the following text information TI to the replace means 10 while instead of the word "invention" dictated by the user, erroneously the word TW1="INVASION" was recognized and instead of the word "NEW" dictated by the user, erroneously the word TW2="FEW" was recognized.

Text information TI="European patents shall be granted for any invasion which are susceptible of industrial application, which are few and which involve an inventive step. The following in particular shall not be regarded as inventions within the meaning of paragraph 1:".

The replace means 10 execute a first part of the text editing method at a block 16 and continuously verify whether the text information TI received from the recognizer means 6 has the structure of the four-word spoken command SB to ascertain whether the recognized text information TI is first text information TI1 or second text information TI2. Since none of the words of the text information TI recognized by the recognizer means 6 is "REPLACE" or "WITH", the replace means 10 will deliver the respectively recognized text information TI as first text information TI1 to the editing means 11.

The editing means 11 then deliver at a block 17 the first text information TI1 as a monitor signal DS to the monitor 3, which displays the first text information TI1—as shown in FIG. 1—after which again block 14 of the flow chart 4 is executed. A cursor C featuring the next position of entry of the editing means 11 stands at this instant at the position after the last sign ":" of the first text information TI1.

According to the example of application the user is now assumed to notice that the spoken word "INVENTION" was recognized erroneously and the first text information TI1 contains the erroneously recognized word TW1="INVASION". The user would then like to edit the erroneously recognized word TW1="INVASION" and replace it with a new word TN="INVENTION", which the recognizer means 6 should actually have recognized instead of the erroneously recognized word TW1="INVASION". Therefore, the user speaks the second text information TI2="REPLACE INVASION WITH INVENTION" of the spoken command SB into the microphone 2 in FIG. 3.

During the execution of block 14, the recognizer means 6 recognize that speech information SI was received and at block 15 the speech recognition method is executed for the received speech information SI, while the speech analysis information SAI determined for this is stored in the speech analysis storage means 9. At the block 16 the text information TI recognized by the recognizer means 6 is checked and it is ascertained that in the recognized text information TI the structure of the four-word spoken command SB is contained, after which the recognized text information TI is stored as second text information TI2.

Subsequently—as shown in FIG. 3—the text information parts TTI contained in the second text information TI2 are assigned to the spoken command parts SB. A text information part TF1="INVASION" is recognized as a second spoken command part SB2, which features the wrong text information part TW1="INVASION" in the first text information TI1. Furthermore, the text information part TI1="INVENTION" is recognized as the fourth spoken command part SB4, which features the new word which is to replace the wrong word in the first text information TI1. Subsequently, the text editing method is proceeded with at a block 18.

At block 18 the replace means 10 check whether the text information part TF1="INVASION" of the second spoken command part SB2 features a word in the first text information TI1. The result of this check is that the eighth word TW1="INVASION" in the first text information TI1 matches the text information part TF1="INVASION" of the second spoken command part SB2. The replace means 10 then deliver the detection information DI to the recognizer means 6 which detection information DI features the eighth word in the first text information TI1.

At a block 19 the replace means 10 check whether the new word TN1="INVENTION" contained in the spoken command SB is equal to the erroneously recognized word TW1="INVASION". This is further discussed with reference to a second example of application of the computer 1 shown in FIG. 1.

When the detection information DI is received, the recognizer means 6 execute a block 20 in which the "re-calculation" is made for the spoken command parts STI, which are supposed to have led to the recognition of the words (". . . granted for any invasion which are . . . ") near to the eighth word in the first text information TI1 and to the recognition of the word "INVASION" of the second spoken command part SB2 and of the word "INVENTION" of the fourth spoken command part SB4. During this process also the speech analysis information SAI is taken into consideration, which is stored during the recognition of the first text information TI1 and the second text information TI2.

During the "re-calculation" the recognizer means 6 have available as additional information for a better recognition the information that for the eighth word in the first text information TI1 actually the word "INVENTION" should have been recognized and that the erroneously recognized word is pronounced by the user as he has pronounced same in the second spoken command part SB2. Because of this "re-calculation" with the additional information, the result of the subsequent replacement is highly reliable. Besides, this additional information can be used for adapting the phoneme information PI and text information part TTI stored in the context memory 7 and for adapting the probability information WI stored in the speech model memory 8.

As a result of the "re-calculation", the editing information EI is delivered to the replace means 10 by the recognizer means 6, which replace means 10 features the now correctly recognized new word "INVENTION" and the position of the eighth word in the first text information TI1 as a position for the replacement. As a result of this re-calculation, also the editing information EI can be determined with which at the same time a plurality of words around the word "invention" featured by the second spoken command part SB2 are replaced. This is the case if, on the basis of the evaluation of the probability information WI, the overall probability of a correct recognition of the first text information TI1 is higher if also the words surrounding the new word in the first text information TI1 are changed.

To terminate the execution of block 20, the recognizer means 6 deliver the text information part TN="INVENTION" very reliably recognized during the "re-calculation" and, as appropriate, the text information part of the words changed around the eighth word to the replace means 10 as editing information EI. The replace means 10 deliver the editing information EI determined by the recognizer means 6 to the editing means 11, after which the execution of the text editing method is continued at a block 21.

At block 21 the editing means 11 position the cursor C at the eighth word TW1="INVASION" in the first text information TI1, after which the text editing method is continued to be executed at a block 22. At block 22 the eighth word TW1="INVASION" is replaced with the new word TN1="INVENTION". At a successively executed block 23, the cursor C is replaced at the original position, thus the position after the last sign ":" of the first text information TI1.

This offers the advantage that the erroneously recognized word TW1="INVASION" is replaced with the word TN1="INVENTION" via only a single spoken command SB, which actually should have been recognized by the recognizer means 6 instead of the erroneously recognized word TW1. The additional advantage is obtained that the cursor C, after the erroneously recognized word has been replaced, is directly put in the right position in the first text information TI1 to continue the dictation of the article 52 of the European patent agreement.

Extremely advantageous is here the efficient use of the information from the recognition of the wrong word to determine the correct replacement during the re-calculation.

In the following, further advantages of the computer 1 will now be explained with reference to the second example of application of the computer 1. According to the second example of application it is assumed that the user of the computer 1 would like to replace the erroneously recognized word TW2="FEW" in the first text information TI1 with the word "NEW" actually dictated at this position. For this purpose, the user speaks the spoken command SB="REPLACE FEW WITH NEW" into the microphone 2, after which the flow chart 4 is continued at block 15.

With the execution of the speech recognition method at block 15, a plurality of alternative text information, parts ATI are determined by the recognizer means 6 for each spoken command part STI and entered into the alternatives table AT, which is shown in FIG. 4. For the second spoken command part STI2 the word TF2 ="SUE" is entered as a first alternative text information part ATI2 and the word TF3 ="FEW" only as a second alternative text information part ATI2 into the alternatives table AT. For the third spoken command part STI3 the word "BY" is entered as a first alternative text information part ATI1 and the word "LIE" as a second alternative text information part ATI2 into the alternatives table AT. Finally, the word "NEW" dictated in the spoken command is erroneously recognized and for the fourth spoken command part STI4 the word TN2 ="FEW" is entered as a first alternative text information part ATI1 into the alternatives table AT. The word TN3="NEW" is only entered as a second alternative text information part AT2 and the word "HUGH" as a third alternative text information part AT3 into the alternatives table AT.

Since the user has not clearly pronounced the word-"FEW" when he uttered the spoken command SB, the recognizer means 6 assigned a higher probability of a correct recognition to the word "SUE" for the second spoken command part STI2 than to the word "FEW". With the recognition of the word "NEW" pronounced by the user, the speech recognition method already had problems during the recognition of the first text information TI1, so that repeatedly the word "FEW" was assigned a higher probability of a correct recognition. Therefore, the alternative text information parts "REPLACE SUE BY FEW" are assumed to be the most probable variants in the second text information TI2 and delivered by the recognizer means 6 as recognized text information TI to the replace means 10.

When the block 16 is executed, the replace means 10 detect that the structure of the four-word spoken command SB is included, after which the flow chart 4 is proceeded with at block 18. When the block 18 is executed, the replace means 10 check whether the word TF2="SUE" contained in the second text information TI2 as a second spoken command SB2 is contained in the first text information TI1. This check proves that the word TF2="SUE" does not appear in the first text information TI1, so that the text editing method is continued at a block 24.

When the block 24 is executed, the replace means 10 read the alternatives table AT stored in the speech analysis storage means 9 and check whether an alternative text information part ATI stored for the second spoken command part STI2 is contained in the first text information part TI1. The replace means 10 detect as a result of the test that the second alternative text information part ATI2—thus the word TF3="FEW"—is contained as the seventeenth word in the first text information part TI1.

This offers the advantage that even when the second spoken command part SB2 was recognized erroneously due to an indistinct pronunciation of the spoken command SB, the word desired by the user is replaced with the correct word. After block 24 has been executed, block 19 is executed.

At block 19 the replace means 10 verify whether the new word TN2="FEW" contained in the spoken command SB is equal to the erroneously recognized word TW2="FEW". The result of this verification is that the two words match, so that the execution of the text editing method is continued into a block 25.

At block 25 the replace means 10 determine the most probable but one alternative text information part ATI2="FEW" as the new word instead of the most probable alternative text information part ATI2="FEW". Subsequently, as described hereinbefore, the blocks 20 to 23 are executed and the word TW2="FEW" in the first text information part TI1 is replaced with the word TN3="NEW".

This offers the advantage that if the word already erroneously recognized in the first text information part TI1 is also recognized erroneously in the spoken command SB, a replacement desired by the user of the computer 1 is most probably carried out nevertheless. If one of the replacements has not led to the desired result for the user with the extensive four-word spoken command, the spoken command "UNDO" can cancel the latest replacement in a very simple manner.

It may be observed that the blocks 14, 15 and 17 in the flow chart 4 represent the speech recognition method and that the blocks 16 and 18 to 25 represent the text editing method.

It may further be observed that each of the four spoken command parts can contain one or various words. Furthermore, the third spoken command part may also be formed by a pause when the four-word spoken command is uttered. In that case the user would in accordance with the first example of application, utter the four-word spoken command "REPLACE INVASION" pause "INVENTION". In that case the four-word spoken command would be featured as a four-word spoken command by the word on the first position in the second text information part TI2 and by the pause detected by the recognition means after the second or further word of the second text information part TI2.

What is claimed is:

1. A speech recognition method (4) with a text editing method for editing a text information part (TW) erroneously recognized in first text information (TI1) with a four-word spoken command (SB) recognized in second text information (TI2), the speech recognition method (4) comprising the following steps:

receiving speech information (SI) and recognizing the first text information (TI1) and the second text information (TI2);

checking whether a word at the first position in the second text information (TI2) matches a first spoken command part (SB1) of the four-word spoken command (SB) and checking whether a word at the third or further position in the second text information (TI2) matches a third spoken command part (SB3) of the four-word spoken command (SB) while, in the event of a positive result of the checks, the next step of the text editing method is executed;

checking whether the first text information (TI1) contains the erroneously recognized text information part (TW) which is featured by a second spoken command part (SB2) in the second text information (TI2) between the first spoken command part (SB1) and the third spoken command (SB3) while, in the event of a positive result of the check, the next step of the text editing method is executed;

replacing the erroneously recognized text information part (TW) in the first text information TI1 with new text information part (TN) which the second text information (TI2) contains as a fourth spoken command part (SB4) of the four-word spoken command (SB) after the third spoken command part (SB3).

2. A speech recognition method (4) as claimed in claim 1 in which after the replacement of the erroneously recognized text information part (TW), a cursor (C) featuring the entry position for further text information (TI) recognized by the speech recognition method (4) is positioned at the end of the most recently recognized first text information (TI1).

3. A speech recognition method (4) as claimed in claim 1, in which the four-word spoken command (SB) has the structure "REPLACE A WITH B" and in which the second spoken command part "A" features an erroneous recognized word and the fourth spoken command part "B" features a word actually to be recognized instead of the erroneously recognized word.

4. A speech recognition method as claimed in claim 1, in which the following steps are provided:

determining alternative text information parts (AT1) for each spoken information part (STI) of the received spoken information (SI) when the second text information (TI2) is recognized, while the alternative text information parts (ATI) contained in the second text information (TI2) have the highest overall probability of a correct recognition of the second text information (TI2), checking whether the first text information (TI1) contains the erroneously recognized text information part (TW) that is characterized by one of the alternative text information parts (ATI) of the second spoken command part (SB2) not contained in the second text information (TI2), and if the check produces a positive result, the erroneously recognized text information part (TW) is replaced with the new text information part (TN).

5. A speech recognition method (4) as claimed in claim 1, in which the following further steps are provided:

determining alternative text information parts (ATI) for each spoken information part (STI) of the received spoken information (SI) when the second text information (TI2) is recognized, while the alternative text information parts (ATI) contained in the second text information (TI2) have the highest overall probability of a correct recognition of the second text information (TI2);

checking whether in the erroneously recognized text information part (TW) contained in the first text information (TI1) matches with the new text information (TN) contained in the second text information (TI2) while, in the event of a positive result of the check, an alternative text information part (ATI) determined for the new text information (TN) is stored as new text information (TN).

6. A computer program product embodied on a computer readable medium, which can be loaded directly into the internal memory of a digital computer (1) and comprises software code sections, while the computer (1) executes the steps of the speech recognition method (4) as claimed in claim 1 when the product runs on the computer (1).

7. A speech recognition device with a text editing capability for editing a text information part (TW) erroneously recognized in first text information (TI1) with a four-word spoken command (SB) recognized in second text information (TI2), the speech recognition device comprising:

a processor in communication with a memory, said processor executing code for:

receiving speech information (SI) and recognizing the first text information (TI1) and the second text information (TI2);

checking whether a word at the first position in the second text information (TI2) matches a first spoken command part (SB1) of the four-word spoken command (SB) and checking whether a word at the third or further position in the second text information (TI2) matches a third spoken command part (SB3) of the four-word spoken command (SB) while, in the event of a positive result of the checks, the next step of the text editing method is executed;

checking whether the first text information (TI1) contains the erroneously recognized text information part (TW) which is featured by a second spoken command part (SB2) in the second text information (TI2) between the first spoken command part (SB1) and the third spoken command (SB3) while, in the event of a positive result of the check, the next step of the text editing method is executed; and replacing the erroneously recognized text information part (TW) in the first text information TI1 with new text information part (TN) which the second text information (TI2) contains as a fourth spoken command part (SB4) of the four-word spoken command (SB) after the third spoken command part (SB3).

8. The speech recognition device as claimed in claim 7, wherein the processor executing for:

replacing the erroneously recognized text information part (TW), and placing a cursor (C) featuring the entry position for further text information (TI) recognized by the speech recognition device at the end of the most recently recognized first text information (TI1).

9. The speech recognition device as claimed in claim 7, wherein the four-word spoken command (SB) has the structure "REPLACE A WITH B" and in which the second spoken command part "A" features an erroneous recognized word and the fourth spoken command part "B" features a word actually to be recognized instead of the erroneously recognized word.

10. The speech recognition device as claimed in claim 7, wherein the processor further executing code for:

determining alternative text information parts (AT1) for each spoken information part (STI) of the received spoken information (SI) when the second text information (TI2) is recognized, while the alternative text information parts (ATI) contained in the second text information (TI2) have the highest overall probability of a correct recognition of the second text information (TI2); and checking whether the first text information (TI1) contains the erroneously recognized text information part (TW) that is characterized by one of the alternative text information parts (ATI) of the second spoken command part (SB2) not contained in the second text information (TI2), and if the check produces a positive result, the erroneously recognized text information part (TW) is replaced with the new text information part (TN).

11. The speech recognition device as claimed in claim 7, wherein the processor further executing code for:

determining alternative text information parts (ATI) for each spoken information part (STI) of the received spoken information (SI) when the second text information (TI2) is recognized, while the alternative text information parts (ATI) contained in the second text information (TI2) have the highest overall probability of a correct recognition of the second text information (TI2); and checking whether in the erroneously recognized text information part (TW) contained in the first text information (TI1) matches with the new text information (TN) contained in the second text information (TI2) while, in the event of a positive result of the check, an alternative text information part (ATI) determined for the new text information (TN) is stored as new text information (TN).

12. The speech recognition device as claimed in claim 7 further comprising:

an input/output device in communication with the processor and the memory.

13. The speech recognition device as claimed in claim 7, wherein the code is stored in the memory.

* * * * *